A. C. IMMER.
EDUCATIONAL DEVICE.
APPLICATION FILED AUG. 22, 1903.

935,258.

Patented Sept. 28, 1909.

Witnesses

Inventor
Anton C. Immer.
By
Attorney

UNITED STATES PATENT OFFICE.

ANTON C. IMMER, OF ARCADIA, MISSOURI, ASSIGNOR OF FORTY-FIVE ONE-HUN-
DREDTHS TO JOHN W. WHITWORTH, OF ARCADIA, MISSOURI.

EDUCATIONAL DEVICE.

935,258.

Specification of Letters Patent. Patented Sept. 28, 1909.

Application filed August 22, 1908. Serial No. 449,850.

*To all whom it may concern:*

Be it known that I, ANTON C. IMMER, citizen of the United States, residing at Arcadia, in the county of Iron and State of Missouri, have invented certain new and useful Improvements in Educational Devices, of which the following is a specification.

This invention is a device of the nature of an abacus, particularly adapted and intended for the education and entertainment of children, with sufficient mechanical manipulation for its operation to stimulate interest in its use.

As hereinafter more fully pointed out, it comprises a frame with rods across the same, and a set of polygonal blocks on each rod, which blocks may be turned to expose desired faces.

The invention is illustrated in the accompanying drawings, in which—

Figure 1:
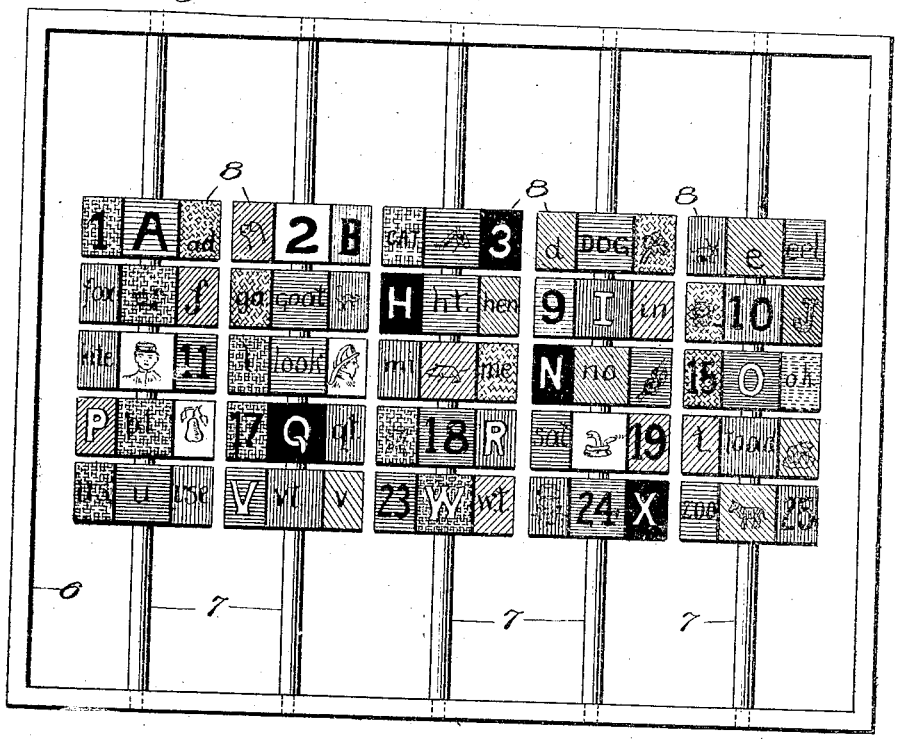
Figure 2:
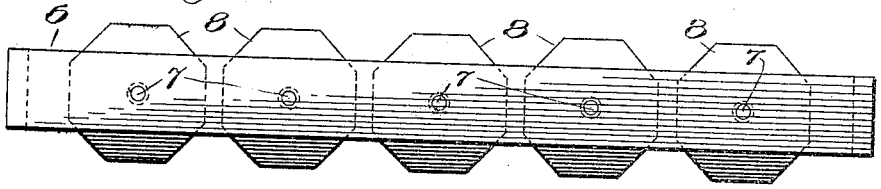

Figure 1 is a front elevation of the device; Fig. 2 is a top edge view.

Referring specifically to the drawings, 6 indicates a rectangular frame, which may be made of metal or other suitable material. A series of round rods 7 extend across the frame and are suitably fastened at their ends to the opposite bars of the frame. The rods are parallel and are spaced apart equal distances. An equal number of similar polygonal blocks 8 are loosely mounted or placed on each rod, the blocks having holes at the center, for that purpose. The blocks shown are octagonal, but may be any other polygon. Each of the side faces of the blocks is distinctively marked, as with a letter, word, picture, number, abbreviation or the like, and also preferably with a distinctive color, so that the device will serve to teach colors, as well as words and symbols. The rods are preferably longer than the rows of blocks, so that longitudinal movement of the blocks in the rods is permitted, as well as rotary movement.

The uses of operations of the device are various. For example, a young child may learn to exhibit similar colors at the front, or the alphabet, by turning the blocks; or to arrange the blocks with similar colors in the same row, either lengthwise or crosswise. An infant may amuse himself by pushing the device along the floor, causing the blocks to roll along and exhibit their variously colored faces and in order that this may be done the sides of the blocks project beyond the frame, so that the blocks and not the frame will contact with the floor when laid thereon, and when the device is pulled along by a string, or pushed along by hand, the blocks will rotate, making an attractive toy. Or the blocks may be spun by snapping with the finger. For older children simple words may be formed by arranging the letters properly, as by shifting the blocks on the rods. And in the same manner sentences may be formed.

Many other ways of using the device will suggest themselves.

Various modifications may be made within the scope of the invention, particularly with respect to the matter marked on the blocks, which may include pictures and the like, or numbers to teach addition and the simpler mechanical operations.

I claim:

A device of the kind described, comprising a frame, a series of rods extending across the same, and a series of polygonal blocks rotatably mounted on the rods, the various faces of the blocks having distinguishing marks thereon and projecting at their sides beyond all parts of the frame, so that when laid on a plane surface the blocks only will contact therewith.

In testimony whereof, I affix my signature in presence of two witnesses.

ANTON C. IMMER.

Witnesses:
MANN RINGE,
R. P. WHITWORTH.